United States Patent
Krumm et al.

[19]

[11] Patent Number: 6,006,793

[45] Date of Patent: Dec. 28, 1999

[54] ROTATING LENO SELVAGE DEVICE WITH DIRECT ELECTROMAGNETIC DRIVE TO A LENO DISK

[75] Inventors: Valentin Krumm, Hergensweiler; Horst Haeussler; Hans-Joachim Holz, both of Lindau, all of Germany

[73] Assignee: Lindauer Dornier Gesellschaft mbH, Lindau, Germany

[21] Appl. No.: 09/123,571

[22] Filed: Jul. 27, 1998

[30] Foreign Application Priority Data

Aug. 1, 1997 [DE] Germany ............................ 197 33 261

[51] Int. Cl.[6] .............................. D03C 7/04; H02K 7/08; H02K 7/14; H02K 11/00
[52] U.S. Cl. ............................................ 139/54; 310/67 R
[58] Field of Search ...................... 139/54, 50; 310/67 R, 310/266–268

[56] References Cited

U.S. PATENT DOCUMENTS

| | | |
|---|---|---|
| 4,720,650 | 1/1988 | Hanamori et al. . |
| 4,853,567 | 8/1989 | Muramatsu et al. . |
| 5,518,039 | 5/1996 | Haeussler et al. . |

FOREIGN PATENT DOCUMENTS

| | | |
|---|---|---|
| 0402240 | 12/1990 | European Pat. Off. . |
| 0777004 | 6/1997 | European Pat. Off. . |
| 3261358 | 11/1991 | Japan . |

Primary Examiner—Andy Falik
Attorney, Agent, or Firm—W. F. Fasse; W. G. Fasse

[57] ABSTRACT

A rotating leno forming device includes a leno disk (3) that has leno thread guides (5) therein and that itself forms a part of the rotor (2) of an electromagnetic drive arrangement. In order to achieve a very compact bearing support arrangement, shield the moving parts against external contamination, and provide for the detection of the rotational position of the leno disk, the leno device further includes a roller or ball bearing (6) of which the outer bearing race (6A) is rigidly connected to the leno disk (3), and of which the inner bearing race (6B) is rigidly connected to a centering holder (9) that is rigidly connected to a housing (8) of the leno device. Permanent magnets (7) are arranged around the circumference of the rotor (2) and cooperate with an electromagnetic stator (11) secured in the housing (8). A position sensor system (10) includes at least one signal emitter (13) mounted on the rotor (2) and a plurality of signal receivers or sensors (14) mounted on the housing (8).

27 Claims, 2 Drawing Sheets

ROTATING LENO SELVAGE DEVICE WITH DIRECT ELECTROMAGNETIC DRIVE TO A LENO DISK

PRIORITY CLAIM

This application is based on and claims the priority under 35 U.S.C. §119 of German Patent Application 197 33 261.7–26, filed on Aug. 1, 1997. The entire disclosure of German Patent Application 197 33 261.7–26 is incorporated herein by reference.

FIELD OF THE INVENTION

The invention relates to a rotating leno selvage forming device with a direct electromagnetic drive for a loom, which is adapted to carry out a full rotational leno binding of the weft threads along the edges of a woven web so as to form a durable selvage of high quality.

BACKGROUND INFORMATION

German Patent 44 05 776 and corresponding U.S. Pat. No. 5,518,039 (Haeussler et al.) discloses a rotational leno selvage forming device having a rotationally driven leno disk that forms the rotor of an electric motor to provide a direct electromagnetic drive for the leno disk. The leno disk has two thread guides arranged symmetrically relative to the center axis of the leno disk, whereby two leno threads respectively supplied from two leno thread spools are respectively guided through the two thread guides. The rotation of the leno disk opens and closes a leno shed for leno-binding the weft threads along the edge of the woven web.

With regard to the arrangement of the leno device, the above mentioned German Patent suggests that it is advantageous to arrange the leno disk with its rotation axis parallel to the weft insertion direction, and with the leno disk spaced away from the if binding point of the web at a necessary minimum distance. The electric motor, of which the leno disk forms the rotor, is for example an electrically actuatable servo motor or stepper motor or the like, that operates according to generally known principles using a radial magnetic flux. The motor windings are carried by the stator while magnets are arranged on the outer circumference of the rotor in a respective partial circular manner. The stator of the motor is received in a housing-like carrier member, which forms a holder for connecting the leno device to the loom.

While the known leno device disclosed in the above mentioned German and U.S. Patent references has been found to be very effective for achieving its stated objects, it has additionally been found to be desirable to provide an improved bearing support for the leno disk forming the rotor of the motor, to provide an improved enclosure whereby the bearing support arrangement and the overall drive is enclosed or shielded from external contaminants such as thread clippings, fly lint and the like, and to provide a system for accurately sensing and measuring the respective angular position of the leno disk at all times. The above mentioned German and U.S. Patent references do not disclose the specific details of the bearing support arrangement for the leno disk and for determining its rotational or angular position, especially in the case of applications in which the leno device is operated with the leno disk rotating in reversing opposite directions.

SUMMARY OF THE INVENTION

In view of the above, it is an object of the invention to provide a rotating leno selvage forming device having a compact and narrow construction, in which the leno disk that guides the leno threads forms the rotor of an electromagnetic drive motor, having a structurally simple and reliable bearing arrangement for supporting the leno disk, including means for absolutely measuring the rotational angle for the purpose of determining the defined angular position of the leno disk, and being so arranged that the drive itself as well as the measuring system is largely shielded from external contaminants. The invention further aims to avoid or overcome the disadvantages of the prior art, and to achieve additional advantages, as apparent from the present description.

The above objects have been achieved in a rotating leno selvage device according to the invention, comprising a housing, a motor stator arranged in the housing, a rolling contact bearing such as a roller bearing or ball bearing including an outer race and an inner race concentrically arranged with rollers or balls therebetween, and a leno disk having two thread guides arranged symmetrically about its center axis. A plurality of permanent magnets are arranged spaced apart from one another around the outer circumference of the leno disk. Particularly according to the invention, the leno disk is fixed to the outer ring or race of the rolling contact bearing so as to rotate therewith, and the housing includes a centering holder that carries the inner race of the rolling contact bearing and is arranged coaxially with the center axis of the leno disk. Thus, the outer race of the bearing, the leno disk and the permanent magnets together form the rotor of the motor, while the inner race of the bearing can be stationarily fixed to the housing by means of the centering holder, to cumulatively form the stator. Preferably further, a signal emitter of an absolute angle measuring or path measuring system for measuring the respective angular position of the leno disk is fixed to the rotor.

In a rotating leno selvage forming device with a direct electromagnetic drive, in which the leno disk forms a part of the rotor of the drive motor, it is an important feature of the invention that the leno disk is rotationally fixed to (i.e. connected to so as to rotate with) the outer race of at least one rolling contact bearing along a circular surface located radially outwardly around the thread guides, while the inner race of the rolling contact bearing is rotationally fixed to a centering holder that is arranged coaxially around the center axis of the rotor. The centering holder may be a centering ring connected to the housing wall that carries the stator, or may be a groove or the like machined into the housing wall.

With the above described arrangement, the leno disk including the thread guides, together with the outer race of the rolling contact bearing forms a rotational structural unit, namely the rotor of the motor that is rotatable about the center axis of the leno device. The permanent magnets respectively arranged in a partial circular manner around the outer circumference of this rotor form the poles that electromagnetically interact with the stator windings that are received in the housing. Preferably, each individual pole comprises at least two permanent magnets.

According to another embodiment of the invention, the leno device further includes a second rolling contact bearing having a respective second outer race and second inner race, arranged side-by-side adjacent, concentrically and axis-parallel with the first rolling contact bearing. In this embodiment, the leno disk is connected to the respective outer race of both the first and second rolling contact bearings, along a circular surface located radially outwardly around the thread guides. Once again in this embodiment, the two outer races of the bearings together with the leno disk form a rotational structural unit, namely the rotor of the motor, that is rotatable about the center axis of the leno device. similarly as above, permanent magnets are respectively arranged in a partial circular manner around the outer circumference of the rotor to provide poles for cooperating with the stator windings arranged in the housing. The respective inner races of the first and second rolling contact bearings are rotationally fixed or secured to respective centering holders that are arranged coaxially about the center axis of the rotor in or on the respective side walls of the housing. Thus, the leno disk itself passes between the two inner races of the two bearings, and a sufficient free play gap must be provided between the leno disk and the respective inner races of the bearings.

At least one outer wall of the stator housing is provided with an extension or bracket or other means for connecting the leno device to a loom.

In order to determine the respective rotational position of the rotor, the present rotating leno device comprises a rotational angle determination or path measuring system. By means of this system, the rotor can be properly positioned in a defined angular position directly after switching on the loom. Furthermore, it can be ensured that the rotation of the leno disk is controlled synchronously with the loom shed formation of the shedding apparatus of the loom for properly synchronizing the leno shed formation cycle. This system can use any known components and methods for determining the angular position of a rotor. For example, the system includes at least one signal emitter mounted on the rotor and a plurality of signal sensors mounted on the housing. The rotational movement and angular position of the at least one signal emitter is detected by the signal sensors, which correspondingly allow the respective angular position of the rotor at any given time to be determined. The further details of the operation and construction of the system are well known to persons of ordinary skill in the art.

BRIEF DESCRIPTION OF THE DRAWINGS

In order that the invention may be clearly understood, it will now be described in connection with two example embodiments, with reference to the drawings, wherein.

DETAILED DESCRIPTION OF PREFERRED EXAMPLE EMBODIMENTS AND OF THE BEST MODE OF THE INVENTION

Figure 1:
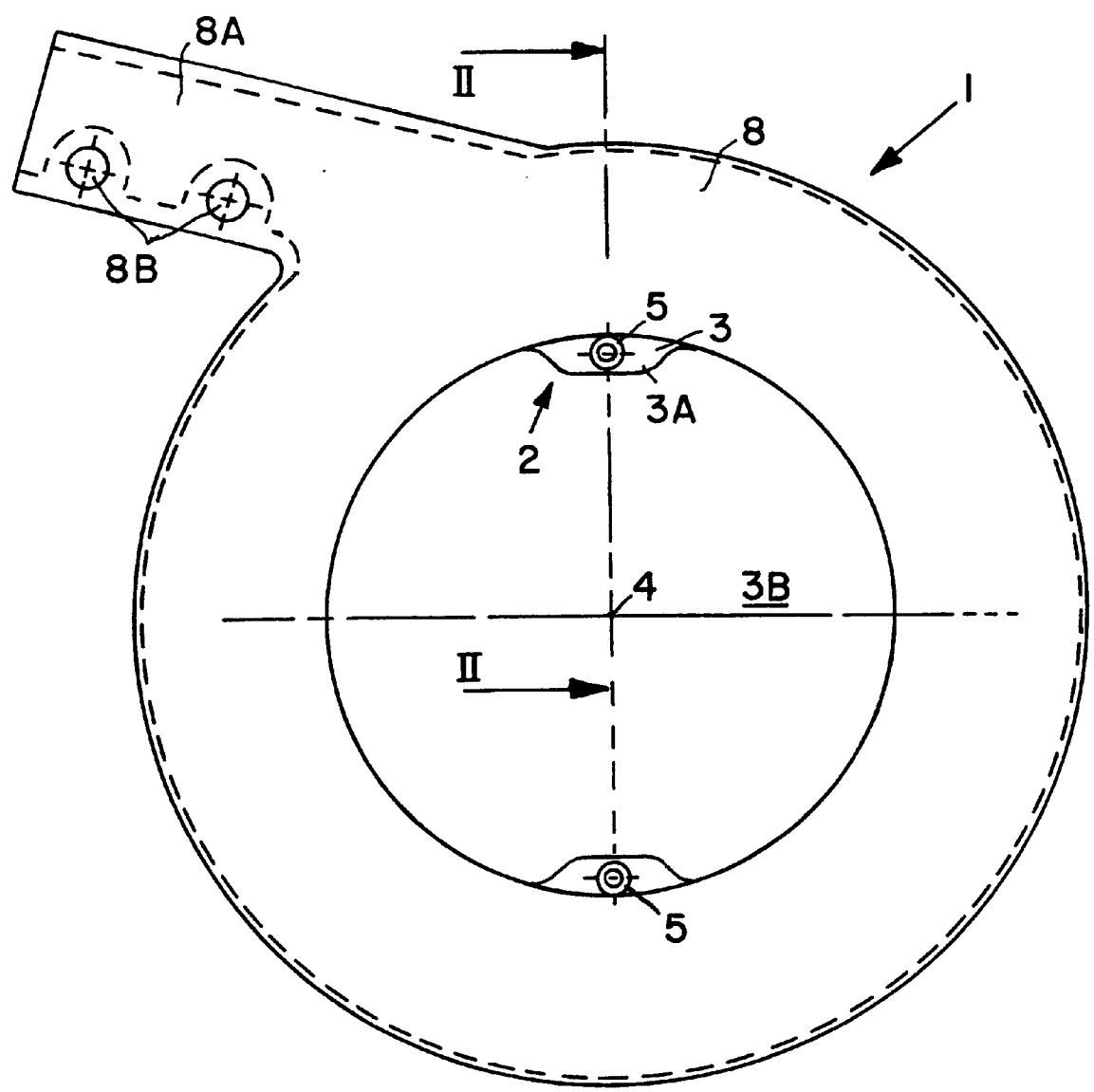
FIG. 1 is a side elevation view of a rotating leno device according to the invention, as seen in the direction of arrow I in FIG. 2.

FIG. 1 schematically shows a rotating leno device 1 including a stator housing 8, with an extension 8A protruding away from the main body of the housing 8, whereby the rotating leno device 1 may be rigidly connected to a machine frame or other supporting structure of a loom, which is not shown. For example, bolts may be secured through bored holes 8B in order to securely connect the rotating leno device 1 on the loom. The mounting may be achieved via an adjustable bracket or mounting arrangement, so that the position of the leno device 1 within the loom is adjustable as desired.

The leno device 1 further includes a leno disk 3 that is embodied substantially as an annular ring having an open hole 3B coaxially through the center thereof, and tabs or lugs 3A protruding radially inwardly from the annular ring into the open hole 3B.

Thread guide eyelets or holes 5 are respectively provided in the lugs 3A, whereby the thread guide eyelets 5 and the lugs 3A are respectively arranged diametrically opposed to each other. The leno disk 3 is arranged to be rotatable about the center axis 4 of the leno device 1.

As can be seen in FIG. 1, the housing 8 includes an annular enclosure that encloses substantially the entire outside of the leno device 1, and thus covers substantially all of the leno disk 3 and the associated bearing and drive arrangements that will be discussed below, while a central opening of the housing coincides with the open hole 3B of the leno disk 3. In this manner, all of the working parts are substantially sealed or shielded against external contamination, for example by thread clippings, fly lint or the like.

Figure 2:
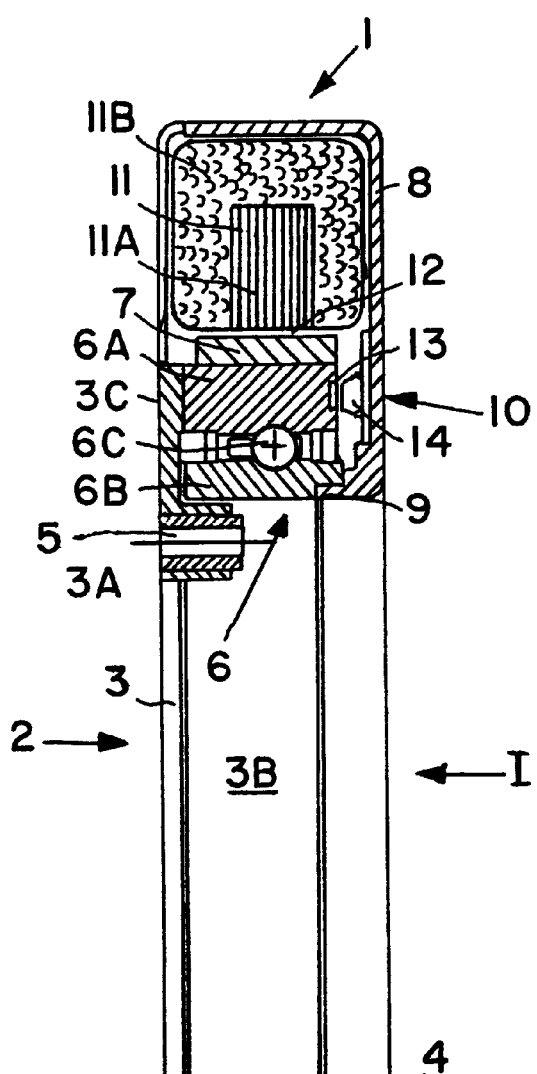
FIG. 2 is a sectional partial view of the leno device of FIG. 1, showing the bearing arrangement and electromagnetic drive arrangement, along the section line II—II in FIG. 1.

FIG. 2 shows a partial cross-section through the leno device 1, along the line II—II of FIG. 1, on a larger scale. The housing 8 is a substantially rotationally symmetrically housing member, for example formed of sheet metal or the like. Received and held within the housing 8 are a rolling contact bearing 6, such as a roller bearing or ball bearing, and an electromagnetic stator arrangement 11. The stator arrangement 11 is made up of laminated stator plates 11A surrounded by stator windings 11B, as generally understood by persons of ordinary skill in the art. The rolling contact bearing 6 comprises an outer ring or race 6A and an inner ring or race 6B arranged coaxially within the outer race 6A, with roller balls and/or rollers 6C arranged therebetween, in any conventional manner. The stator arrangement 11 and the inner race 6B of the bearing 6 are secured against rotation relative to the housing 8, e.g. the stator 11 and the inner race 6B of the bearing 6 are rigidly fixed to the housing 8, in any manner understood by persons of ordinary skill in the art.

Particularly according to the invention, the inner race 6B of the bearing 6 is rotationally fixed, i.e. secured against relative rotation, to the housing 8 by means of a centering holder 9 having any desired configuration. For example, the centering holder 9 may be a protruding flange rim of the housing 8 to which the inner race 6B is secured by means of a press fit, a form-locking fit, spot welding, brazing, or adhesive bonding. Alternatively, the centering holder 9 may be a groove or recess provided in the housing 8 for receiving the inner race 6B of the bearing 6.

The annular disk 3C of the leno disk 3 is rigidly fixed to the outer race 6A of the bearing 6, in such an arrangement that the outer circumference of the leno disk 3 is substantially flush with the outer circumference of the outer bearing race 6A, while the lugs 3A with the thread guide eyelets 5 protrude radially inwardly beyond the inner bearing race 6B. The connection between the annular ring 3C of the leno disk 3 and the outer bearing race 6A is carried out in any known manner. A free play gap remains between the inner bearing race 6B and the leno disk 3. With this arrangement, the outer circumference of the leno disk 3 and the outer circumference of the outer bearing race 6A form a common outer circumference, on which individual permanent magnets 7 or groups of permanent magnets 7 are respectively arranged in a partial circular manner, while forming a generally cylindrical air gap 12 between the magnets 7 and the electromagnetic stator arrangement 11. Thus, the permanent magnets 7, the outer bearing race 6A, and the leno disk 3 including the thread guide eyelets 5 together form a rotational structural unit, namely the rotor 2 of the electromagnetic drive arrangement, that is rotatable about the center axis 4 of the rotating leno device 1. On the other hand, the stator 11, housing 8, centering holder 9, and the inner bearing race 6B for a stationary structural unit.

In order to detect and determine the respective rotational position of the leno disk 3 at any time, and for thereby allowing proper control of the leno disk 3 and especially the control of the rotational direction reversal of the leno disk 3, an absolute rotational angle measuring system or a path measuring system 10 is provided for and associated with the rotor 2. Such a system 10 is necessary since the rotor 2 or particularly the leno disk 3 must be positioned at a defined angular position immediately after switching on the loom. FIG. 2 schematically shows one possible embodiment of the system 10, comprising at least one or a plurality of signal emitters 13 mounted around the periphery of the outer bearing race 6A and at least one or preferably a plurality of signal receivers 14 mounted on a side wall of the housing 8. The particular construction and operation of such a system 10 can be according to any conventional teachings. The system could, for example, operate on an optical detection basis, a contact-less electromagnetic detection basis, or a contacting electrical basis.

Figure 3:
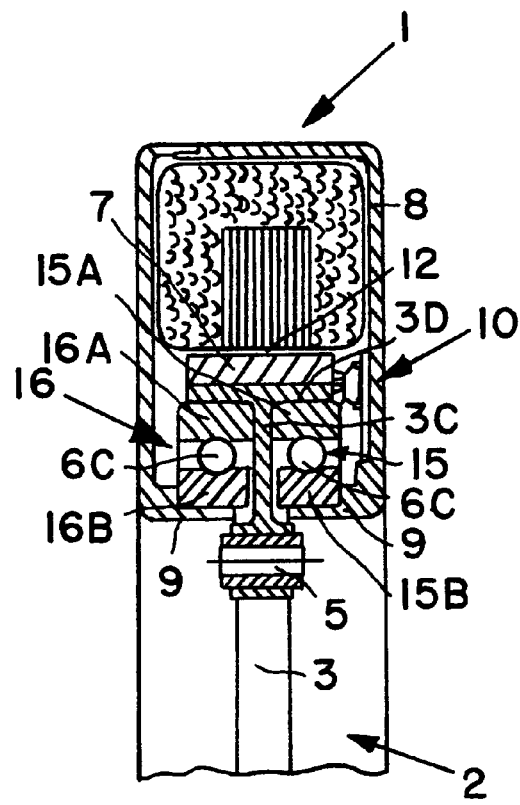
FIG. 3 is a view similar to that of FIG. 2, but showing a second embodiment of a bearing arrangement according to the invention.

FIG. 3 is a view similar to that of FIG. 2 but showing a modified embodiment of the bearing arrangement for rotatably supporting the leno disk 3. While the embodiment of FIG. 2 uses a single bearing 6, with the annular ring 3C of the leno disk 3 arranged laterally next to the bearing 6, the present embodiment of FIG. 3 uses first and second rolling contact bearings 15 and 16 with an annular ring 3C of the leno disk 3 arranged centrally therebetween. In this case, the leno disk 3 further includes a circumferential flange or rim 3D forming a T-shaped cross-section with the annular ring 3C. The first bearing 15, such as a roller bearing or ball bearing, includes an outer race 15A and an inner race 15B with roller balls 6C arranged therebetween, while the second bearing 16 similarly includes an outer race 16A, an inner race 16B, and roller balls 6C arranged therebetween. The circumferential rim 3D and/or the annular ring 3C of the leno disk 3 is rigidly connected to the outer bearing races 15A and 16A, while a clearance gap remains between the annular ring 3C and the inner bearing races 15B and 16B. The inner bearing races 15B and 16B are rotationally rigidly secured to respective centering holders 9 connected to or extending from the opposite side walls of the housing 8. The housing 8 in this case conveniently has a two-part clam shell design.

Once again in the embodiment of FIG. 3, the leno disk 3, the outer bearing races 15A and 16A and the plurality of permanent magnets 7 arranged around the outer circumference of the circumferential rim 3D of the leno disk 3 together form the rotor 2 of the electromagnetic drive arrangement. The rotating leno device 1 according to FIG. 3 is also equipped with a rotational angle measuring system or a path measuring system 10 as has been schematically illustrated and described above with the reference to FIG. 2. The arrangement of FIG. 3 using two bearings 15 and 16 bilaterally and symmetrically supporting the leno disk 3 is especially advantageous for achieving a better force distribution of any arising radial forces, as well as a balanced support of axially directed forces.

The arrangement according to the invention provides a very compact leno device, with a structurally simple and cost-economical bearing arrangement for rotatably supporting the leno disk incorporated directly into an electromagnetic drive arrangement. Moreover, since the housing substantially completely encloses the leno device according to the invention, the danger of contamination of the drive arrangement by fly lint or thread clippings is almost completely eliminated. The present rotating leno device is completely flexible and adaptable in its application, since the integrated electromagnetic drive can be controlled and operated as needed for any particular application, especially since it incorporates a position determining system. Thus, the present rotating leno device can be used both for operation with reversible rotation directions as well as unidirectional rotation without reversal.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A leno selvage device for a loom, comprising
   a housing adapted to be connected to the loom,
   a first rolling contact bearing including a first outer bearing race and a first inner bearing race, wherein said first inner bearing race is arranged coaxially radially within said first outer bearing race and is supported by said housing,
   an electromagnetic stator secured within said housing,
   a rotatable leno disk that has at least one leno thread guide adapted to guidingly receive a leno thread therein, and that is secured to said first outer bearing race for rotation therewith, and
   a plurality of permanent magnets secured around a circumference of said leno disk and spaced with a gap relative to said electromagnetic stator for electromagnetic interaction is therewith.

2. The leno selvage device according to claim 1, further comprising a centering holder that is rigidly or integrally connected with said housing and that supports said first inner bearing race.

3. The leno selvage device according to claim 2, wherein said housing comprises a housing side wall and said centering holder comprises a flange rim protruding toward said first rolling contact bearing from said housing side wall.

4. The leno selvage device according to claim 2, wherein said housing comprises a housing side wall and said centering holder comprises a groove in said housing side wall facing said first rolling contact bearing.

5. The leno selvage device according to claim 2, wherein said centering holder is arranged coaxially and rotationally uniformly about a center axis of said leno selvage device.

6. The leno selvage device according to claim 2, wherein said first inner bearing race is secured to said centering holder so as to prevent relative rotation therebetween.

7. The leno selvage device according to claim 1, wherein said rolling contact bearing is a bearing selected from the group consisting of a roller bearing including rollers arranged between said first inner and outer bearing races, and a ball bearing including balls arranged between said first inner and outer bearing races.

8. The leno selvage device according to claim 1, wherein said housing, said electromagnetic stator and said first inner bearing race together form a stationary structural unit, and wherein said leno disk, said first outer bearing race and said permanent magnets together form a rotatable structural unit that is rotatable relative to said stationary structural unit.

9. The leno selvage device according to claim 8, further comprising one of an angle measuring system and a path distance measuring system for measuring a rotational angular position of said rotatable structural unit, including at least one signal emitter mounted on said rotatable structural unit.

10. The leno selvage device according to claim 9, wherein said signal emitter is one of an electromagnetically detectable signal emitter and an optically detectable signal emitter.

11. The leno selvage device according to claim 9, wherein said one of an angle measuring system and a path distance measuring system is an absolutely measuring incremental measurement system that further includes at least one signal receiver mounted on said stationary structural unit axially adjacent said at least one signal emitter, and that is adapted to sense and absolutely locate an incremental position of said at least one signal emitter using said at least one signal receiver.

12. The leno selvage device according to claim 9, wherein said one of an angle measuring system and a path distance measuring system further includes a plurality of signal receivers arranged on said stationary structural unit and adapted to sense said at least one signal emitter.

13. The leno selvage device according to claim 12, wherein said at least one signal emitter comprises a plurality of signal emitters arranged distributed circumferentially around said rotatable structural unit.

14. The leno selvage device according to claim 9, wherein said at least one signal emitter is particularly mounted on said leno disk of said rotatable structural unit.

15. The leno selvage device according to claim 9, wherein said at least one signal emitter is particularly mounted on said first outer bearing race of said rotatable structural unit.

16. The leno selvage device according to claim 1, wherein said leno disk comprises an annular ring with an open center hole at an axial center of said disk, and at least one lug protruding radially inwardly from said annular ring with said at least one leno thread guide provided therein.

17. The leno selvage device according to claim 16, wherein said leno disk comprises two of said lugs protruding radially inwardly from said annular ring at diametrically opposed locations, and two of said leno thread guides respectively provided on said two lugs.

18. The leno selvage device according to claim 16, wherein said housing comprises an annular enclosure with a housing opening at an axial center of said annular enclosure, said leno disk is arranged with said open center hole coinciding with said housing opening such that said at least one lug of said leno disk protrudes radially inwardly into said housing opening.

19. The leno selvage device according to claim 18, wherein said annular enclosure is so arranged that only one axially-facing side face of said annular ring, said at least one lug, and a radially inwardly facing surface of said first inner bearing race are exposed externally of said annular enclosure.

20. The leno selvage device according to claim 18, wherein said annular enclosure encloses an annular interior space therein and has a radially inwardly facing circumferential slot, and wherein said first bearing, said stator, said annular ring and said magnets are received and enclosed in said annular interior space, and said at least one lug protrudes radially inwardly through said circumferential slot.

21. The leno selvage device according to claim 16, wherein respective free motion clearances are provided between said annular ring and said first inner bearing race, between said at least one lug and said first inner bearing race, and between said annular ring and said housing.

22. The leno selvage device according to claim 1, wherein said gap between said magnets and said stator is a cylindrical annular air gap.

23. The leno selvage device according to claim 1, wherein said leno disk comprises an annular ring having a substantially L-shaped cross-section, and said leno disk is rigidly connected to said first outer bearing race.

24. The leno selvage device according to claim 23, including only said first rolling contact bearing and no further rotational bearing, wherein said annular ring is arranged axially adjacent said first rolling contact bearing with an outer circumference of said annular ring arranged flush with an outer circumference of said first outer bearing race, and said magnets are arranged on at least said outer circumference of said first outer bearing race.

25. The leno selvage device according to claim 1, further comprising a second rolling contact bearing including a second outer bearing race and a second inner bearing race arranged radially inwardly coaxially within said second outer bearing race, wherein said leno disk comprises an annular ring having a substantially T-shaped cross-section, and said leno disk is rigidly connected to said first and second outer bearing races.

26. The leno selvage device according to claim 25, wherein said first and second rolling contact bearings are arranged coaxially with one another and axially adjacent one another with a spacing gap therebetween, wherein said annular ring includes a radially extending annular disk and an axially extending cylindrical rim adjoining a radially outer edge of said annular disk, wherein said annular disk passes between said first and second rolling contact bearings through said spacing gap and said cylindrical rim is arranged radially outwardly around and rigidly connected to an outer circumference of said first and second outer bearing races, and wherein said magnets are arranged on an outer circumference of said cylindrical rim.

27. The leno selvage device according to claim 25, wherein said first and second inner bearing races are respectively connected to said housing so as to prevent relative rotation therebetween.

\* \* \* \* \*

UNITED STATES PATENT AND TRADEMARK OFFICE
CERTIFICATE OF CORRECTION

PATENT NO.   : 6,006,793
DATED        : December 28, 1999
INVENTOR(S)  : Valentin Krumm, et al It is certified that error appears in the above-identified patent and that said Letters Patent is hereby corrected as shown below:

Column 1, line 36, before "binding" delete "if"
Column 6, line 35, after "interaction" delete "is".

Signed and Sealed this

Twenty-sixth Day of September, 2000

*Attest:*

Q. TODD DICKINSON

*Attesting Officer*         *Director of Patents and Trademarks*